United States Patent [19]

Stagg

[11] Patent Number: 5,456,405
[45] Date of Patent: Oct. 10, 1995

[54] DUAL BIAS WELD FOR CONTINUOUS COILED TUBING

[75] Inventor: Robert E. Stagg, Kingwood, Tex.

[73] Assignee: Quality Tubing Inc., Houston, Tex.

[21] Appl. No.: 162,456

[22] Filed: Dec. 3, 1993

[51] Int. Cl.$^6$ .......................... B23K 33/00; B23K 101/06
[52] U.S. Cl. ........................... 228/147; 228/125; 228/171; 228/5.7
[58] Field of Search ..................................... 228/125, 145, 228/146, 147, 171, 5.7; 156/157–159; 29/2.25, 33 D

[56] References Cited

U.S. PATENT DOCUMENTS

| | | | |
|---|---|---|---|
| 379,663 | 5/1888 | Root | 138/154 |
| 677,712 | 7/1901 | Stapf | 228/125 |
| 2,886,691 | 5/1959 | Rudd | 219/67 |
| 3,279,050 | 10/1966 | Simich | 228/125 |
| 3,336,657 | 8/1967 | Flaming | 228/171 |
| 3,523,513 | 8/1970 | Maier et al. | 219/61.2 |
| 3,697,718 | 10/1972 | Von Hollen et al. | 219/62 |
| 3,829,602 | 8/1974 | Ishikawa et al. | 174/102 R |
| 3,912,151 | 10/1975 | Martin et al. | 228/171 |
| 4,863,091 | 9/1989 | Dubois | 228/5.7 |
| 5,191,911 | 3/1993 | Dubois | 138/100 |

Primary Examiner—Samuel M. Heinrich
Attorney, Agent, or Firm—Fish & Richardson

[57] ABSTRACT

A dual bias weld is an improved weld for joining strips to be formed into coiled tubing. Tubing is formed from a first strip and a second strip, the first and second strips being of the same width. A planar end surface is formed on an end of the first strip, the plane of the planar end surface being defined by a line lying along a top surface of the first strip at an acute angle with respect to the longitudinal direction of the first strip and a line lying along an edge surface of the first strip at an acute angle with respect to the longitudinal of the first strip. Similarly, a planar end surface is formed on an end of the second strip, the plane of the planar end surface being defined by a line lying along a top surface of the second strip at an acute angle with respect to the longitudinal direction of the second strip and a line lying along an edge surface of the second strip at an acute angle with respect to the longitudinal direction of the second strip. A composite strip is formed by welding the planar end surface of the first strip to the planar end surface of the second strip to form a dual bias weld. Excess weldment is then removed from top, bottom and edge surfaces of the composite strip such that the width of the weld is identical to the width of the first and second strips. Coiled metal tubing is then formed from the composite strip.

9 Claims, 7 Drawing Sheets

DUAL BIAS WELD FOR CONTINUOUS COILED TUBING

BACKGROUND OF THE INVENTION

The invention relates to the manufacture of coiled tubing. More particularly, the invention relates to an improved weld for continuous coiled tubing.

Coiled metal tubing has many applications in the petroleum industry. For example, coiled metal tubing can be used to insert high pressure fluids into a well, to guide measuring instruments into a well, and in many instances for oil well drilling, production, and flow line applications. Typically, the coiled metal tubing is stored on a large reel from which it can be uncoiled for insertion into the well and recoiled when the operation is complete.

Metal tubing is formed by bending flat strip into tubing and welding along the longitudinal seam. Because the length of strip commercially available is limited, however, the length of metal tubing which can be formed by this process is also limited. Thus, assuming the maximum length of strip available in the desired size is 4,000 feet, if a 20,000 foot length of coiled metal tubing is desired, according to the prior art it would be necessary to butt weld five 4,000 lengths of coiled tubing formed from five lengths of strip.

Butt welding two lengths of metal tubing forms a weld such as that shown in FIG. 1. The weld has a ring of weldment 1 and a heat-affected zone 3A, 3B on each side thereof. Because the heat-affected zones are unable to withstand repeated coiling and uncoiling stresses, the composite 20,000 length of coiled metal tubing would typically break at one of the butt welds after it had been coiled and uncoiled several times. This breakage would, at the very least, require rewelding of the tubing, and frequently would require fishing a length of tubing from the bottom of the well. Also, the ring of weldment 1 shown in FIG. 1 extends inwardly so as to partially block the inner diameter of the tubing. In addition to interrupting fluid flow through the tubing, this decrease in inner diameter tends to obstruct passage of measurement devices sent through the tubing.

To overcome the disadvantages in the prior art discussed above, the assignee of the present invention developed the helical weld shown in FIG. 2, which is described in detail in U.S. Pat. Nos. 4,863,091 and 5,191,911, the disclosures of which are hereby incorporated by reference. To form the helical weld, two lengths of strip 5A, 5B are cut at complimentary acute angles (preferably 45°) as shown in FIG. 3a. The strips are then butted together, and are welded along the diagonal seam (see FIG. 3b). To provide excess weldment at the edges of the joined strip and to prevent burnout at the edges of the strips, tabs 7A, 7B may be tack welded to the edges of the strips prior to welding, and a welding head 9 is moved from the outer edges of the first tab 7A along the diagonal joint to the outer edge of the second tab 7B. Thus, a weld is formed which is perpendicular to the top and bottom surfaces of the strips (see FIG. 3c) and at an acute angle to the longitudinal direction Z thereof.

Once the weld is completed, the tabs 7A, 7B are removed, and the top, bottom, and side surfaces in the vicinity of the weld are finished such that the resulting weld has dimensions identical to the dimensions of the original strip.

When the composite strip formed from the two strips 5A, 5B is then formed into tubing as shown in FIG. 2, the weld 11 takes on a helical shape which begins and ends at the longitudinal seam 13. To allow time for completion of the angled weld and finishing steps in the tube mill, an accumulator may be used as described in the prior patents mentioned above. Alternatively, the composite strip can be formed to a desired length and coiled onto a payoff wheel, from which it may then be unreeled at a constant rate for formation of tubing.

As a result of the prior art weld, the inner and outer diameters of the tubing in the vicinity of the weld 11 are uniform. Thus, the weld does not obstruct flow of fluid through the tubing or movement of measuring devices. In addition, no heat-affected zones are formed and the helical weld is able to withstand repeated coiling and uncoiling stresses.

SUMMARY OF THE INVENTION

The present invention improves upon the above-described prior art by providing a dual bias weld for formation of continuous coiled tubing. Particularly, in one aspect, the invention relates to a method of forming coiled tubing from a first strip and a second strip, the first and second strips being of the same width, the method comprising the steps of forming a planar end surface on an end of the first strip, the plane of the planar end surface being defined by a line lying along a top surface of the first strip at an acute angle with respect to the longitudinal direction of the first strip and a line lying along an edge surface of the first strip at an acute angle with respect to the longitudinal of the first strip; forming a planar end surface on an end of the second strip, the plane of the planar end surface being defined by a line lying along a top surface of the second strip at an acute angle with respect to the longitudinal direction of the second strip and a line lying along an edge surface of the second strip at an acute angle with respect to the longitudinal direction of the second strip; forming a composite strip by welding the planar end surface of the first strip to the planar end surface of the second strip to form a dual bias weld, the dual bias weld extending beyond top, bottom, and edge surfaces of the composite strip; removing excess weldment from the top, bottom, and edge surfaces of the composite strip such that the width the weld is identical to the width of the first and second strips, a planar surface is formed along the bottom surface of the composite strip, and a smooth continuous surface is formed connecting the top surfaces of the first and second strips; and forming coiled tubing from the composite strip.

In another aspect, the invention relates to a coiled tubing product having means to withstand repeated coiling and uncoiling stresses, the coiled tubing product being made from a first strip and a second strip, the first and second strips being of the same width, the coiled tubing product being made by: forming a planar end surface on an end of the first strip, the plane of the planar end surface being defined by a line lying along a top surface of the first strip at an acute angle with respect to the longitudinal direction of the first strip and a line lying along an edge surface of the first strip at an acute angle with respect to the longitudinal direction of the first strip; forming a planar end surface on an end of the second strip, the plane of the planar end surface being defined by a line lying along a top surface of the second strip at an acute angle with respect to the longitudinal direction of the second strip and a line lying along an edge surface of the second strip at an acute angle with respect to the longitudinal direction of the second strip; forming a composite strip by welding the planar end surface of the first strip to the planar end surface of the second strip to form a dual bias weld, the dual bias weld extending beyond top, bottom, and edge surfaces of the composite strip; removing excess weldment from the top, bottom and edge surfaces of the composite strip such that the width of the weld is identical to the width of the first and second strips, a planar surface is formed along the bottom surface of the composite strip, and a smooth, continuous surface is formed connecting the top surfaces of the first and second strips; and forming the coiled tubing product from the composite strip.

In some embodiments, each of the acute angles is 45°. In some embodiments, the composite strip is reeled onto a payoff wheel prior to formation of coiled tubing. In some embodiments, the dual bias weld is formed using a welding device which is angled so as to move through the plane of the dual bias weld.

In some embodiments, the planar end surfaces of the first and second strips are formed by cutting at a dual bias. In other embodiments, the planar end surfaces of the first and second strips are formed by cutting at a single bias and milling the resulting edge.

In some embodiments, radiographic inspection is performed of the composite strip. In some embodiments, radiographic inspection is performed of the coiled tubing.

In some embodiments, the first and second strips are of the same thickness.

In another aspect, the invention relates to a coiled tubing product comprising a first tubing section of uniform outer diameter; a second tubing section of uniform outer diameter; and a helical weld joining the first tubing section and the second tubing section to form a continuous length of tubing, the continuous length of tubing having a longitudinal seam; wherein the helical weld begins and ends at the longitudinal seam, and wherein at each intersection between the helical weld and the longitudinal seam the helical weld is biased at an acute angle with respect to the longitudinal direction of the continuous length of tubing.

DESCRIPTION OF THE PREFERRED EMBODIMENTS

Preferred embodiments of the invention will now be described with reference to the accompanying figures.

Figure 4:
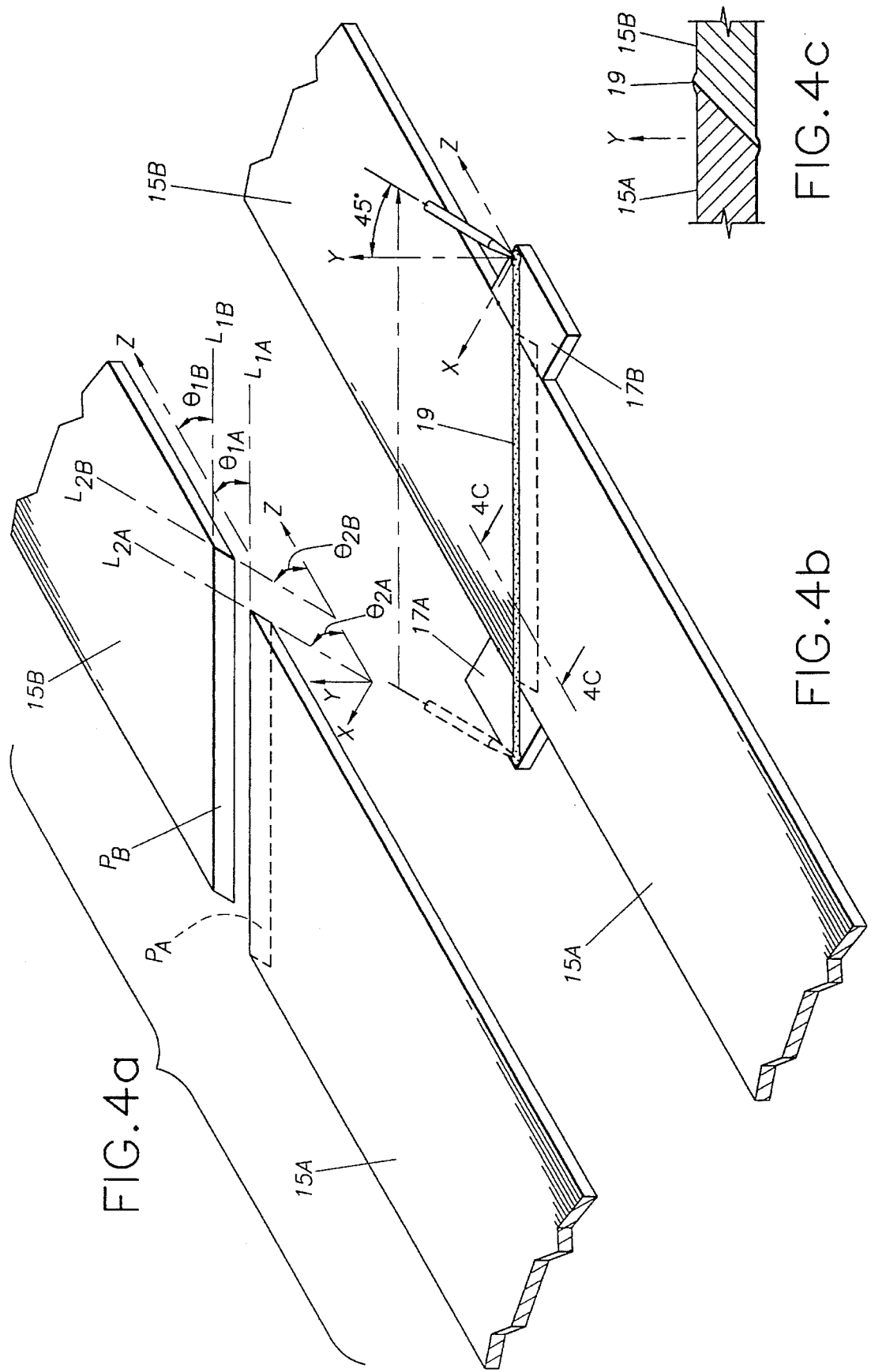
FIGS. 4a–4c illustrate formation of a dual bias weld according an embodiment of the invention.

A dual bias weld according to one embodiment of the invention is illustrated in FIG. 4a. Two strips 15A, 15B to be joined are cut at complimentary acute angles, both with respect to the longitudinal direction Z of the strips and with respect to the vertical direction Y. The result of this is that the end surfaces of the strips 15A, 15B lie in planes $P_A$, $P_B$ defined by, respectively, a first line $L_{1A}$, $L_{1B}$ lying along the top surface of the strip and forming an acute angle $\theta_{1A}$, $\theta_{1B}$ with the longitudinal direction Z of the strip, and a second line $L_{2A}$, $L_{2B}$ lying along an edge surface of the strip and forming an acute angle $\theta_{2A}$, $\theta_{2B}$ with the longitudinal direction Z of the strip. The acute angles are preferably all 45°.

The complimentary planar end surfaces $P_A$, $P_B$ of the strips 15a and 15b can be formed by cutting an end portion of each strip at a dual bias with a band saw or the like, or by cutting each strip vertically at a 45° to the longitudinal direction Z with a shear or band saw and then milling each end to produce the second 45° angle with respect to the vertical direction Y.

Once the complimentary planar end surfaces have been formed, strips 15A and 15B are butted together and tabs 17A, 17B are tack welded to the strips as shown in FIG. 4b. The joint is then welded with a plasma arc welder 9 or the like, which is tilted 45° from vertical. Thus, a dual bias weld 19 results which is at 45° to both the longitudinal direction Z of the strips and 45° to the vertical direction Y (see FIG. 4c).

Figure 8:
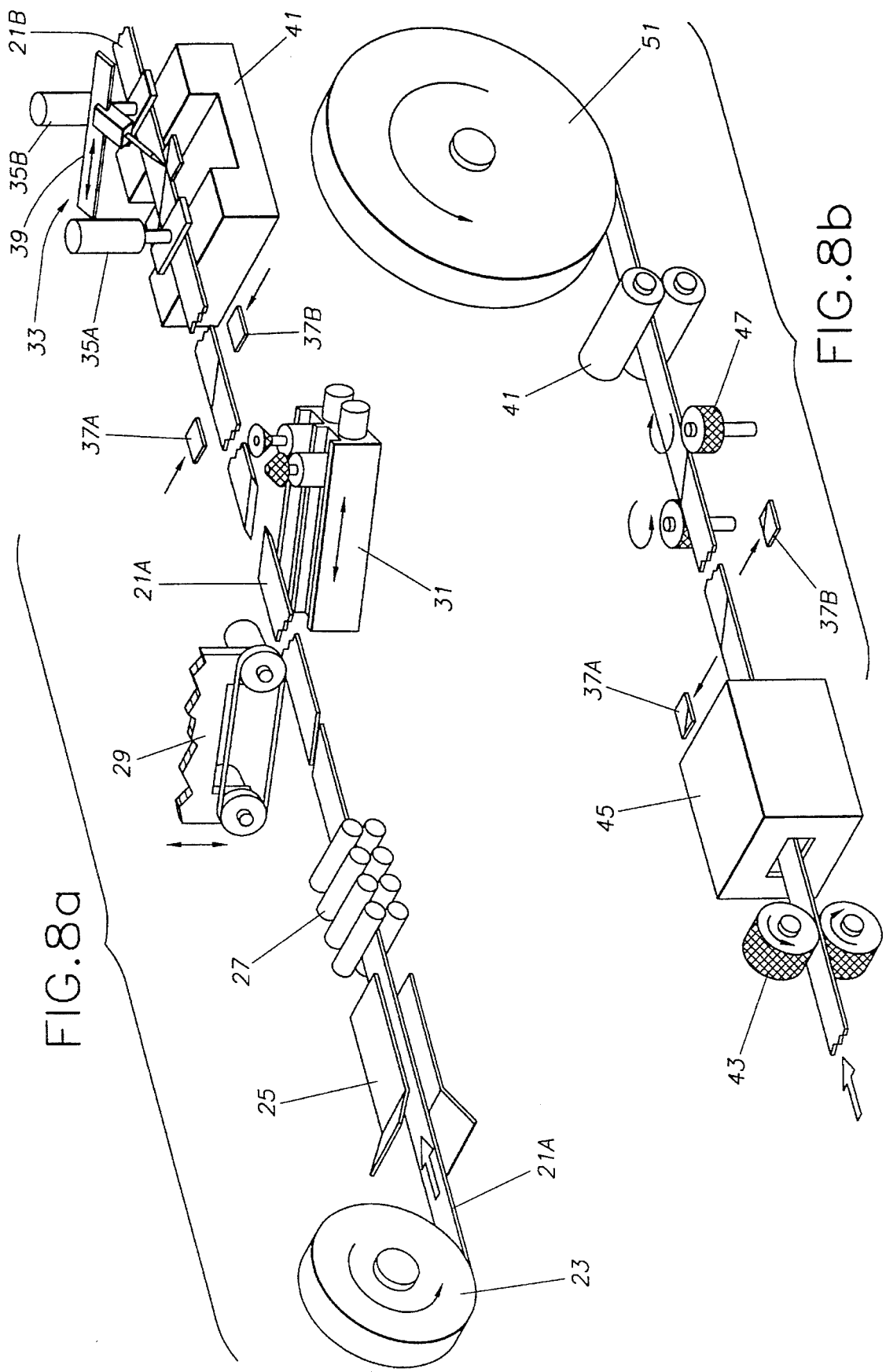
FIGS. 8a–8b are schematic diagrams illustrating formation of composite strip in accordance with a preferred embodiment of the invention.
Figure 9:
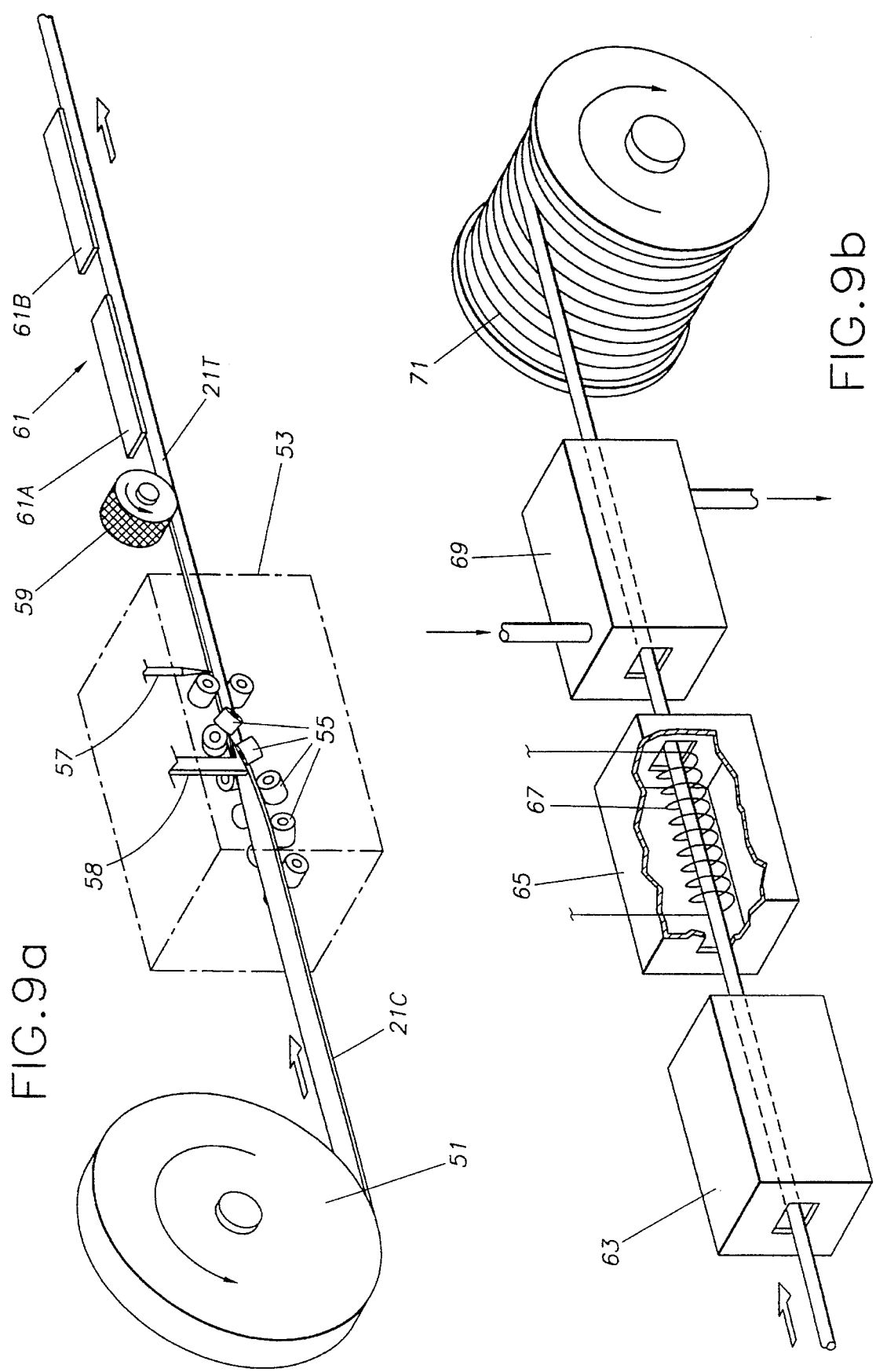
FIGS. 9a–9b are schematic diagrams illustrating formation of continuous coiled tubing in accordance with a preferred embodiment of the invention.

The complete process of forming continuous coiled tubing according to a preferred embodiment of the invention will now be described with reference to FIGS. 8 and 9. Referring first to FIGS. 8a–8b, a length of strip 21A of desired dimensions is taken from a reel 23 using alligator feed 25. Because strip is usually purchased in large sheets and then cut to desired widths, the strip is passed through multi-roll flattener 27 to remove strip edge damage caused by cutting of the strip. The end of the strip 21A is then cut vertically at a 45° angle to the longitudinal direction of the strip by band saw 29. Once this cut is completed, the end of strip 21A is moved to mill edger 31, which mills the 45° vertical cut to be 45° with respect to the vertical axis of the strip. Then, the milled end of strip 21A is advanced to welding station 33, where it is abutted against a complimentary end of a strip 21B already formed by band saw 29 and mill edger 31.

The abutted ends are held in place by piston clamps 35A, 35B, and tabs 37a, 37b are tack welded to the edges of the strips. A weld is then made by welder 39 beginning on tab 37a and ending on tab 37b along the dual bias joint between strips 21A and 21B. The welder 39 is preferably a plasma arc welder, but may also be a TIG or flash welder. The welder 39 moves along a track disposed at a 45° angle to the longitudinal direction of the strips, and is also tilted at 45° with respect to the vertical axis of the strip so as to follow the dual bias plane of the joint. A heat-weld focusing bed 41 is provided underneath the joint comprising a brass or copper plate to focus the heat of the weld.

Once the welding is complete, the joint is advanced through top and bottom grinder 43 to remove excess weldment from the top and bottom surfaces of the joint. Where strips 21A and 21B are of identical thickness, the grinding results in uniform planar top and bottom surfaces in the area of the joint. In the event the strips are not of the same thickness, as is the case when a tapered string is manufactured, grinding will produce a planar bottom surface and a "ramped" top surface in the vicinity of the joint. Particularly, when a stepped joint is being formed in a tapered string in accordance with the present invention, the welding process must leave sufficient excess weldment on the top surface of the joint to allow a smooth, continuous surface to be formed by grinding away the excess weldment.

Figure 3:
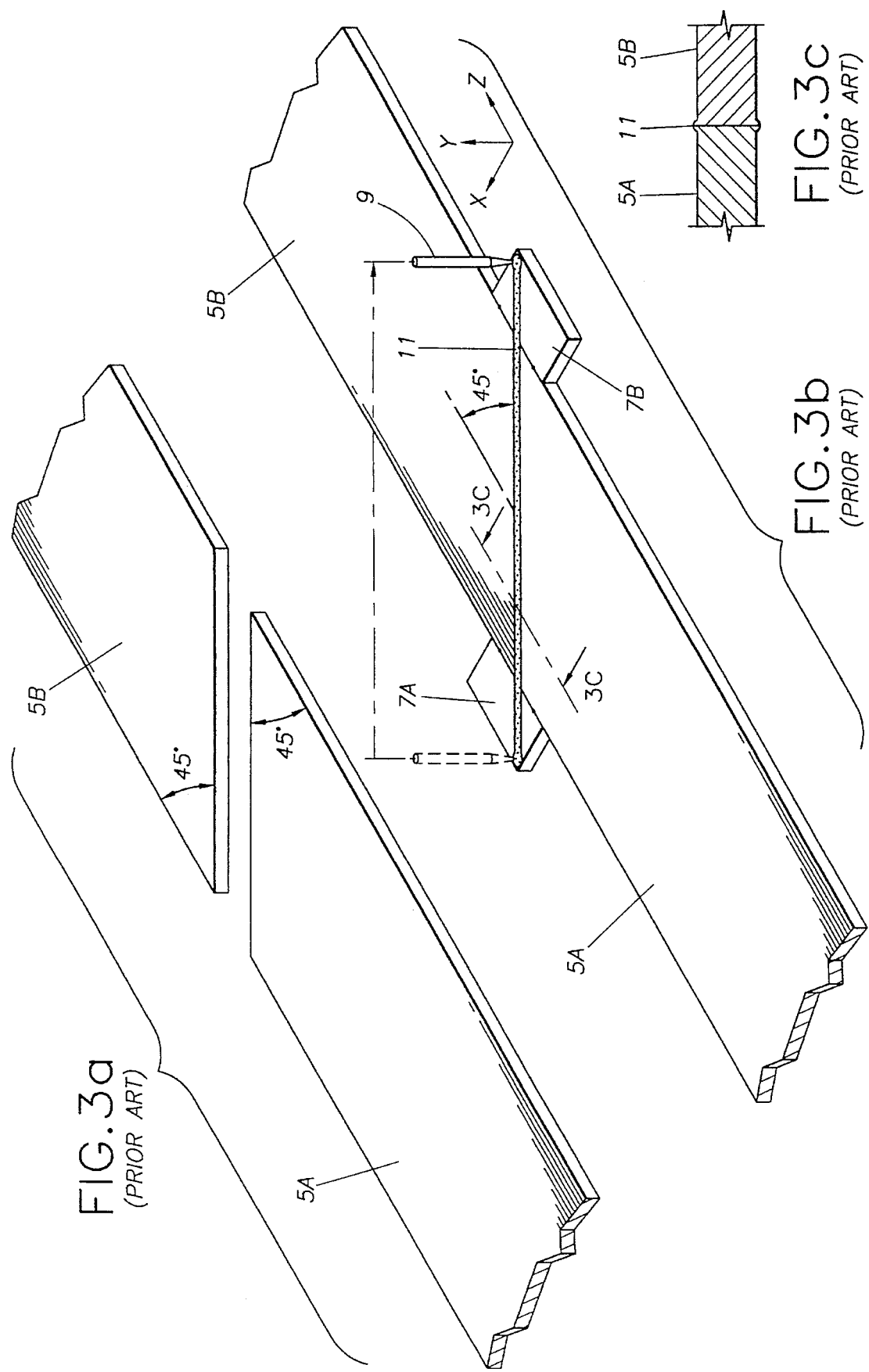
FIGS. 3a–3c illustrate formation of a conventional single-bias weld.
Figure 5:
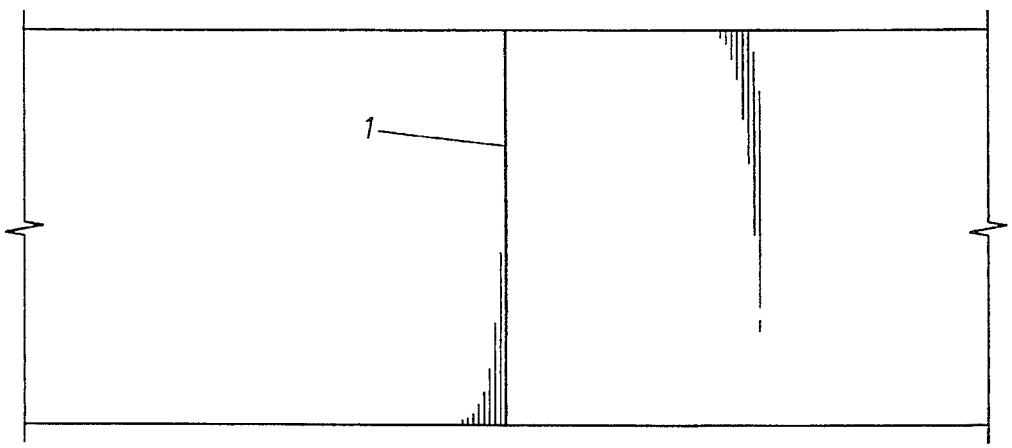
FIG. 5 is a top view illustrating the results of radiographic inspection of a transverse weld in the strip.
Figure 6:
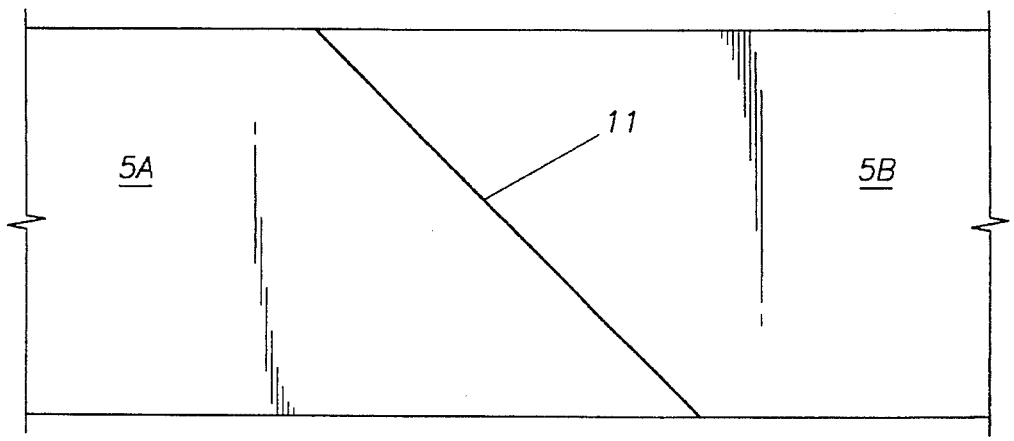
FIG. 6 is a top view illustrating the results of radiographic inspection of a single bias weld in the strip.
Figure 7:
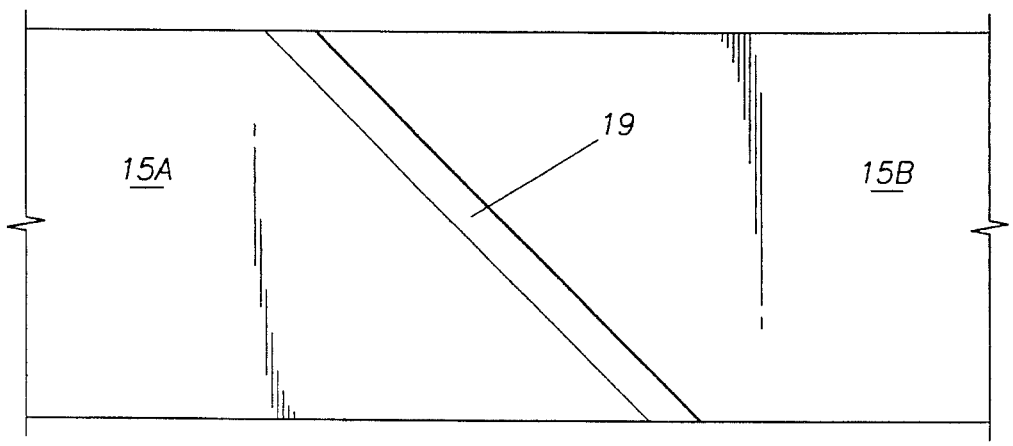
FIG. 7 is a top view illustrating the results of radiographic inspection of a dual bias weld in the strip.

After grinding, the joint is advanced to radiographic inspection device 45, which inspects the joint using x-ray, ultrasonic, and/or mag particle techniques. At this stage, if a simple transverse weld were subjected to radiographic inspection in the vertical direction, the inspection would result in a straight line view of the weld as shown in FIG. 5. Similarly, when the prior art bias weld of FIG. 3b is inspected in the strip, only a straight-line view is obtained (see FIG. 6). Because the actual interior portion of the weld cannot be seen in these views, various imperfections in the weld may be missed in the inspection process. When the weld of the present invention is inspected in the vertical direction, however, the view illustrated in FIG. 7 is obtained, which allows inspection of the entire weld from a single viewpoint. Thus, the weld of the present invention allows greatly enhanced inspection of the weld in the strip. Also, if for example ultrasonic inspection is used at a 45° angle to the vertical in the opposite direction of the bias of the weld, a fully perpendicular view of the weld may be obtained. Thus, the possibility of defects in the weld passing through the inspection process without detection is greatly reduced.

Subsequent to the inspection process, the tabs 37A, 37B are sheared off and the edges are ground by an edge grinder 47. After the edges are finished, the weld is planished by heat rollers 41, and the resulting strip is accumulated onto payoff wheel 51.

Referring now to FIGS. 9a–9b, the wheel 51 is moved to the tube formation line and the composite strip 21C is fed into tube formation device 53. Within the tube formation device 53, strip is formed into tube 21T by a plurality of dies and rollers 55, and the longitudinal seam is welded by welder 57. Preferably, a scarfer 58 fits within the newly formed tubing and removes excess weldment from the interior of the tube. The tubing 21T is then passed through scarfer 59 which removes excess weldment from the exterior of the tubing, and a seam annealer 61 which anneals the longitudinal weld. Seam annealer 61 preferably comprises two horizontal plates 61A, 61B which heat the top portion of the tubing near the longitudinal weld to ensure proper treatment of the weld.

The completed tubing 21T is passed through non-destructive testing (NDT) device 63, preferably comprising an eddy current testing device, which provides constant inspection of the integrity of the whole tube. The tubing is then passed through full body annealing device 65, which comprises a helical heating coil 67, and through a bath 69 which cools the tubing for coiling onto coil 71.

Figure 1:
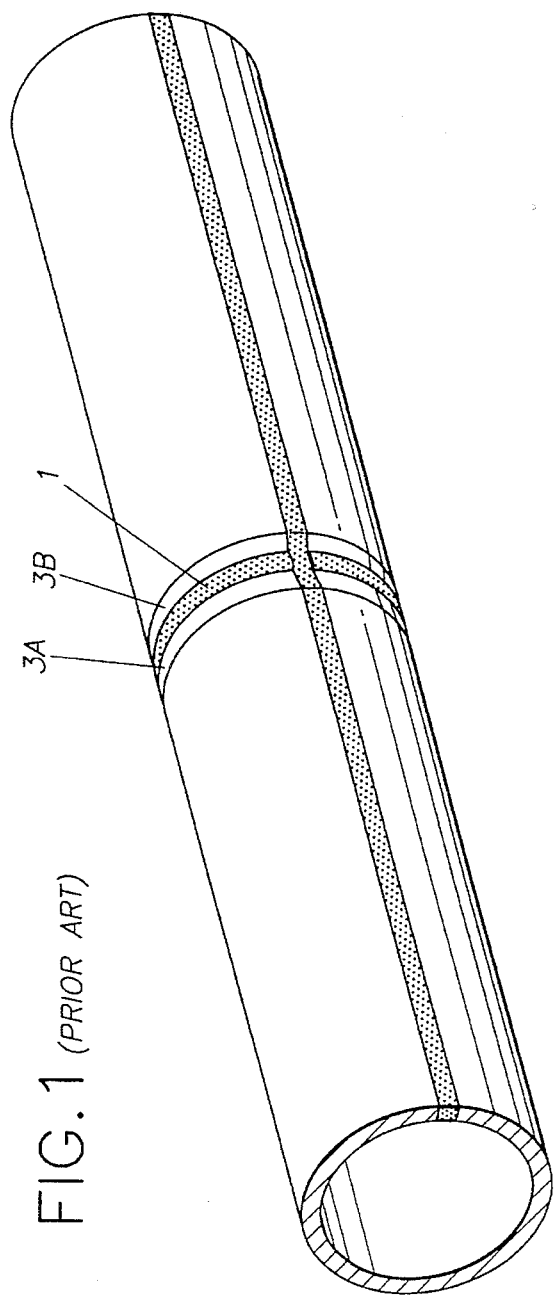
FIG. 1 is a perspective view of a conventional butt weld.
Figure 2:
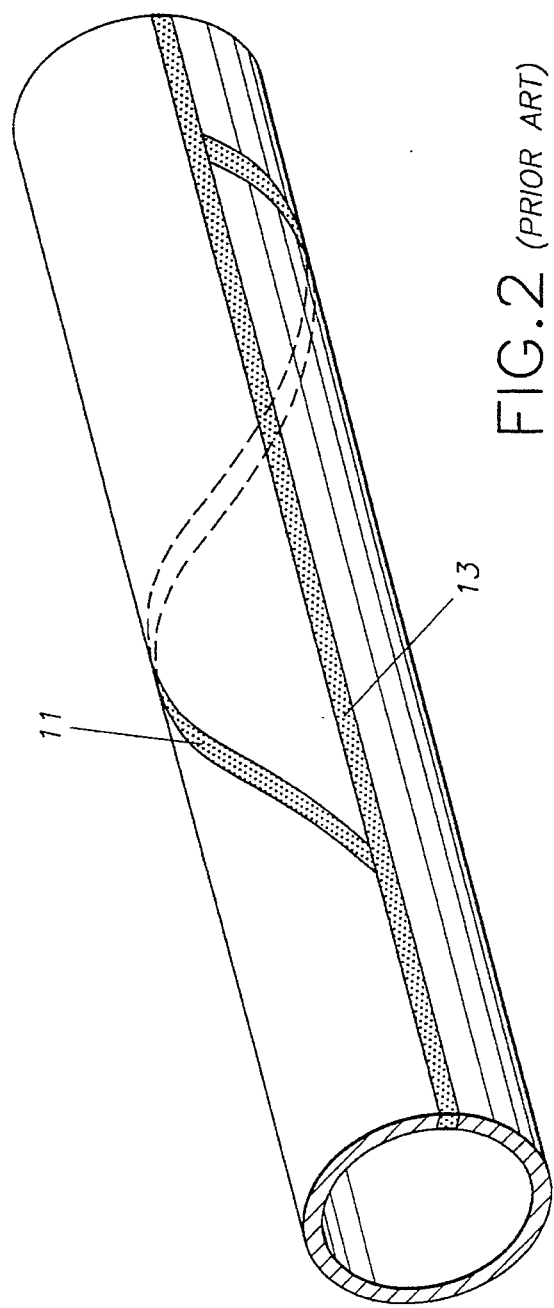
FIG. 2 is a perspective view of a conventional helical weld.
Figure 10:
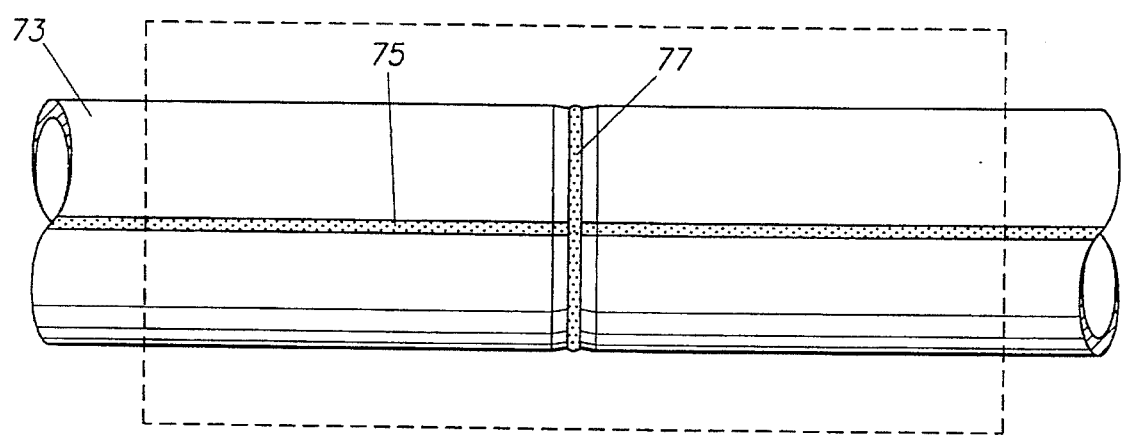
FIG. 10 is a top view illustrating the results of radiographic inspection of a butt weld in tubing.
Figure 11:
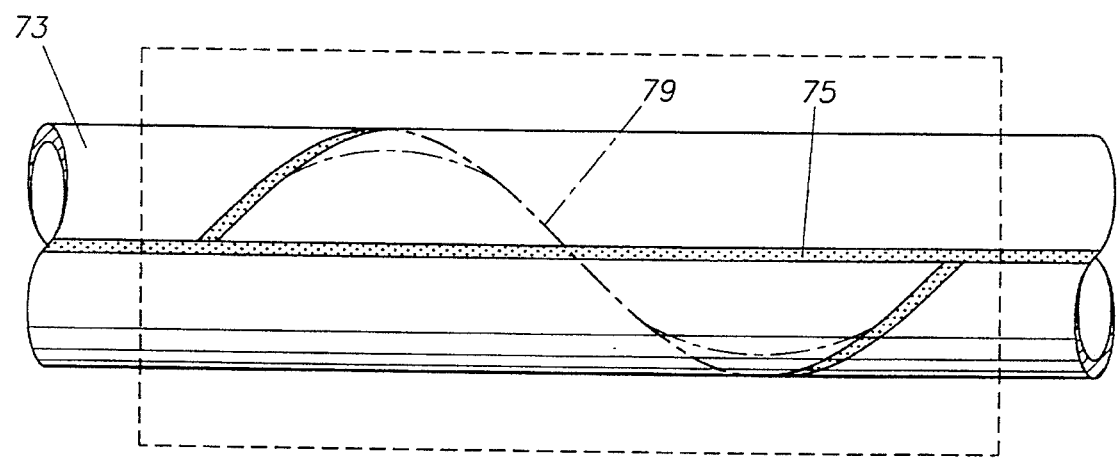
FIG. 11 is a top view illustrating the results of radiographic inspection of a conventional helical weld in tubing.
Figure 12:
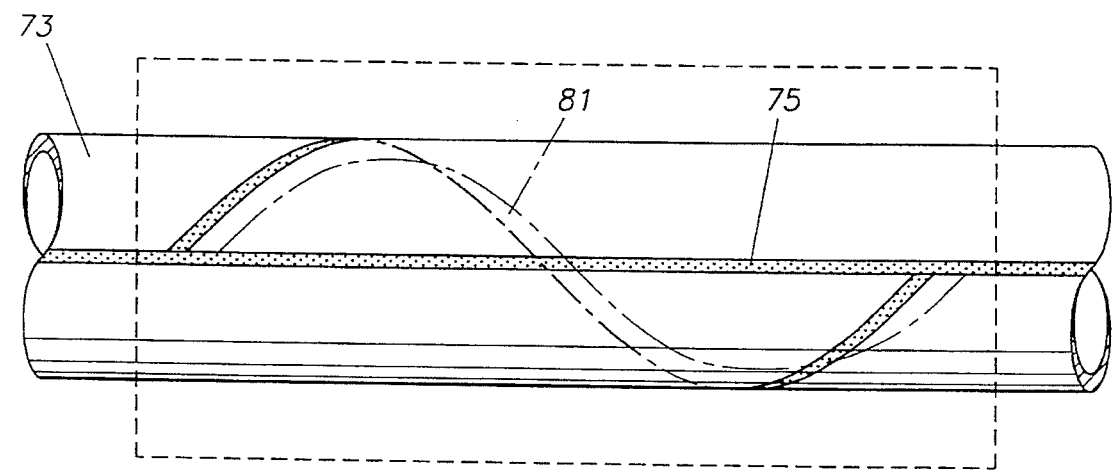
FIG. 12 is a top view illustrating the results of radiographic inspection of a dual bias weld in tubing.

Once formation of a desired length of coiled metal tubing is completed, it may be desirable to inspect the weld by x-ray or other techniques. If vertical inspection of a length of tubing 73 having a longitudinal weld 75 and a butt weld 77 (formed in the manner of prior art FIG. 1) is inspected, the view illustrated in FIG. 10 will be obtained. Clearly, this view provides relatively little information about the condition of the weld 77. If the same inspection is performed on a length of tubing 73 having a helical weld 79 formed in accordance with prior art FIGS. 3a–3b, the view illustrated in FIG. 11 is obtained. While this view provides more information about the condition of the weld than the view of FIG. 10, if a length of tubing 73 is inspected which has a weld 81 formed in accordance with the present invention, the view illustrated in FIG. 12 is obtained. Clearly, this view allows improved inspection of virtually all surfaces of the weld. Thus, inspectability of the weld in the field is greatly enhanced, and the chances of detecting a faulty weld are greatly improved.

The dual bias weld of the invention also provides another advantage over the prior art. Particularly in the vertical weld of the prior art, the amount of weldment remaining in the weld after grinding of the top and bottom surfaces is limited to the thickness of the strips. However, according to the present invention, the dual bias weld leaves approximately 20% more filler in the weld than the prior art.

While various embodiments have been described in detail above, the invention is not so limited, but rather is limited only by the scope of the appended claims.

What is claimed is:

1. A method of forming coiled tubing from a first strip and a second strip, said first and second strips being of the same width, said method comprising the steps of:

forming a planar end surface on an end of said first strip, the plane of said planar end surface being defined by a line lying along a top surface of said first strip at an acute angle with respect to the longitudinal direction of said first strip and a line lying along an edge surface of said first strip at an acute angle with respect to the longitudinal of said first strip;

forming a planar end surface on an end of said second strip, the plane of said planar end surface being defined by a line lying along a top surface of said second strip at an acute angle with respect to the longitudinal direction of said second strip and a line lying along an edge surface of said second strip at an acute angle with respect to the longitudinal direction of said second strip;

forming a composite strip by welding the planar end surface of said first strip to the planar end surface of said second strip to form a dual bias weld, said dual bias weld extending beyond top, bottom, and edge surfaces of said composite strip;

removing excess weldment from the top, bottom, and edge surfaces of the composite strip such that the width of the weld is identical to the width of the first and second strips, a planar surface is formed along the bottom surface of said composite strip, and a smooth continuous surface is formed connecting the top surfaces of said first and second strips; and forming tubing from the composite strip.

2. The method claimed in claim 1, wherein each of said acute angles is approximately 45 degrees.

3. The method claimed in claim 1, wherein said composite strip is reeled onto a payoff wheel prior to formation of coiled tubing.

4. The method claimed in claim 1, wherein said dual bias weld is formed using a welding device which is angled so as to move through the plane of the dual bias weld.

5. The method claimed in claim 1, wherein the planar end surfaces of said first and second strips are formed by cutting at a dual bias.

6. The method claimed in claim 1, wherein the planar end surfaces of said first and second strips are formed by cutting at a single bias and milling the resulting edge.

7. The method claimed in claim 1, further comprising the step of performing radiographic inspection of the composite strip.

8. The method claimed in claim 1, further comprising the step of performing radiographic inspection of the coiled tubing.

9. The method claimed in claim 1, wherein said first and second strips are of the same thickness, and wherein said smooth continuous surface connecting the top surfaces of said first and second strips is a plane.

* * * * *